(12) United States Patent
Sakairi et al.

(10) Patent No.: US 6,614,511 B1
(45) Date of Patent: Sep. 2, 2003

(54) LIGHT WAVELENGTH DISPERSION MEASURING APPARATUS AND LIGHT WAVELENGTH DISPERSION MEASURING METHOD

(75) Inventors: Yoshiyuki Sakairi, Kanagawa (JP); Takao Minami, Kanagawa (JP)

(73) Assignee: Ando Electric Co., Ltd., Kanagawa (JP)

( * ) Notice: Subject to any disclaimer, the term of this patent is extended or adjusted under 35 U.S.C. 154(b) by 0 days.

(21) Appl. No.: 09/697,903

(22) Filed: Oct. 27, 2000

(30) Foreign Application Priority Data

Oct. 29, 1999 (JP) .......................... P11-310028

(51) Int. Cl.[7] .............................................. G01N 21/00
(52) U.S. Cl. ..................................................... 356/73.1
(58) Field of Search .......................... 356/73.1; 359/110, 359/135, 159, 161, 173, 153, 156, 180, 181, 179; 250/227.18, 227.23; 385/122, 126, 123, 24, 27

(56) References Cited

U.S. PATENT DOCUMENTS

| 4,551,019 A | 11/1985 | Vella et al. |
| 4,556,314 A * | 12/1985 | Stone .......................... 356/73.1 |
| 4,799,789 A * | 1/1989 | Tsukamoto et al. ......... 356/73.1 |
| 5,406,368 A | 4/1995 | Horiuchi et al. |

FOREIGN PATENT DOCUMENTS

| EP | 0280329 A2 | 8/1988 |
| JP | 2000275143 A | 10/2000 |
| JP | 2000304655 A | 11/2000 |

* cited by examiner

Primary Examiner—Frank G. Font
Assistant Examiner—Tu T. Nguyen
(74) Attorney, Agent, or Firm—Fish & Richardson P.C.

(57) ABSTRACT

In a light wavelength dispersion measuring apparatus 1, three band-pass filters BPa1 to BPa3 are connected in parallel, three band-pass filters BPb1 to BPb3 are connected in parallel, and three phase comparators PCa to PCc are connected in parallel for making it possible to conduct phase difference measurement of the nth-order harmonics (n=1, 4, 8) at the same time, so that a wavelength dispersion calculator 10 can calculate the wavelength dispersion values of the nth-order harmonics (n=1, 4, 8) at the same time. As a result, measurement time of measuring the wavelength dispersion characteristic in the light wavelength dispersion measuring apparatus 1 can be shortened.

6 Claims, 5 Drawing Sheets

LIGHT WAVELENGTH DISPERSION MEASURING APPARATUS AND LIGHT WAVELENGTH DISPERSION MEASURING METHOD

BACKGROUND OF THE INVENTION

1. Field of the Invention

The invention relates to a light wavelength dispersion measuring apparatus and a light wavelength dispersion measuring method for measuring a wavelength dispersion characteristic of an optical fiber.

2. Description of the Related Art

Hitherto, the wavelength dispersion characteristic of the optical fiber has been found from degradation of propagation time relative to the wavelength of an optical signal, namely, the group delay characteristic; generally, the wavelength dispersion characteristic of the optical fiber is represented by propagation time difference per unit length. In optical fiber communications using the optical fiber as a transmission line, distortion occurs in a signal waveform after transmission because of a relationship between the wavelength spread of an optical signal and the wavelength dispersion characteristic of the optical fiber, and the reception characteristic is degraded; this is a problem.

Further, in an optical amplification relay system, the wavelength dispersion characteristic of each optical fiber forming a part of the system is accumulated, thus the effect of a nonlinear phenomenon of the optical fiber caused by the wavelength dispersion characteristic on the transmission characteristic is extremely large. Therefore, to construct a light communication system, it is indispensable to keep track, of the wavelength dispersion characteristic in detail.

FIG. 5 is a block diagram to show the main configuration of a light wavelength dispersion measuring apparatus 20 in a related art. In FIG. 5, the light wavelength dispersion measuring apparatus 20 comprises an electrical oscillator 21 for supplying a single frequency signal, a tunable wavelength Laser diode source 22 provided by placing a plurality of light sources having different light wavelengths, respectively, or a tunable wavelength Laser diode source 22 of a single light source capable of oscillating a plurality of light wavelength signals, an optical fiber directional coupler 23 for branching output of the tunable wavelength Laser diode source 22, a reference optical fiber 24, a measured optical communication line 25 of an optical amplification relay system, etc., connecting one stage or multiple stages of optical fiber using an optical fiber or an optical amplifier, a photoelectric converter 26 for receiving output of the reference optical fiber 24 and converting the optical signal into an electric signal, a photoelectric converter 27 for receiving output of the measured optical communication line 25 and converting the optical signal into an electric signal, and a phase comparator 28 for making a comparison between phases of the electric signals output by the photoelectric converter 26 and 27.

The electrical oscillator 21 supplies a single frequency signal for strength-modulating the optical signal output of the tunable wavelength Laser diode source 22 to the tunable wavelength Laser diode source 22. The strength-modulated optical signal from the tunable wavelength Laser diode source 22 is branched through the optical fiber directional coupler 23. The optical signal branched to one, which is used as a reference signal in the phase comparison, is applied to reference input of the phase comparator 28 through the reference optical fiber 24 which is short and the photoelectric converter 27. The optical signal branched to the other is input to the phase comparator 28 through the measured optical communication line 25 and the photoelectric converter 26. The phase comparator 28 detects the phase difference between the two optical signals. If the phase comparison is made for each wavelength, the group delay characteristic can be obtained.

That is, relative propagation time τ (λ) of the measured optical communication line 25 at light wavelength λ is found according to the following expression (1) from measured phase difference θ (λ):

$$\tau(\lambda)=\theta(\lambda)/2\pi f \quad (1)$$

where f is the oscillation frequency of the electrical oscillator 21.

If the relative propagating time τ (λ) is converted into unit distance, kilometers (km) and the wavelength λ is used to enter the horizontal axis and the relative propagation time τ (λ) is used to enter the vertical axis, the group delay characteristic is found and further the τ (λ) characteristic is differentiated by the wavelength λ, whereby the wavelength dispersion characteristic can be obtained.

However, the above described light wavelength dispersion measuring apparatus 20 in the related art is adapted to change the wavelength and measure the wavelength dispersion characteristic, and thus involves a problem of prolonging the measurement time. The length of the optical fiber used with the measured optical communication line 25 changes due to change in ambient temperature during measurement, thus causing a measurement error to occur in the relative propagation time τ (λ); this is also a problem.

SUMMARY OF THE INVENTION

It is an object of the invention to provide a light wavelength dispersion measuring apparatus and light wavelength dispersion measuring method for making it possible to shorten measurement time of measuring a wavelength dispersion characteristic and to correct a measurement error of relative propagation time τ (λ) caused by ambient temperature change.

A light wavelength dispersion measuring apparatus comprising:

a short pulse light generator for generating short pulse light;

a first photoelectric conversion unit for executing photoelectric conversion of measured pulse light input from the short pulse light generator through a device under test (DUT) and for outputting a measured pulse signal;

a second photoelectric conversion unit for executing photoelectric conversion of reference pulse light branched and input from the short pulse light generator and for outputting a reference pulse signal;

a first band-pass filter for allowing only an arbitrary frequency component to pass through from the measured pulse signal output from the first photoelectric conversion unit and for outputting a measured frequency signal;

a second band-pass filter for allowing only the same arbitrary frequency component to pass through from the reference pulse signal output from the second photoelectric conversion unit and for outputting a reference frequency signal;

a phase comparison unit for detecting a phase difference between the measured frequency signal output from the first band-pass filter and the reference frequency signal output from the second band-pass filter and for outputting a phase difference signal; and a wavelength dispersion calculation unit for measuring a group delay amount based on the phase difference signal output from the phase comparison unit and for calculating a wavelength dispersion value.

According to the first aspect of the invention, the first photoelectric conversion unit executes photoelectric conversion of measured pulse light input from the short pulse light generator for emitting short pulse light through the device under test (DUT) and outputs a measured pulse signal, the second photoelectric conversion unit executes photoelectric conversion of reference pulse light branched and input from the short pulse light generator and outputs a reference pulse signal, the first band-pass filter allows only an arbitrary frequency component to pass through from the measured pulse signal output from the first photoelectric conversion unit and outputs a measured frequency signal, the second band-pass filter allows only the same arbitrary frequency component to pass through from the reference pulse signal output from the second photoelectric conversion unit and outputs a reference frequency signal, and the phase comparison unit detects the phase difference between the measured frequency signal output from the first band-pass filter and the reference frequency signal output from the second band-pass filter and outputs a phase difference signal, and then the wavelength dispersion calculation unit measures a group delay amount based on the phase difference signal output from the phase comparison unit and calculates a wavelength dispersion value.

The invention of fourth aspect comprises:

a first photoelectric conversion step of executing photoelectric conversion of measured pulse light of short pulse light emitted from a short pulse light generator, provided through a device under test (DUT) and outputting a measured pulse signal;

a second photoelectric conversion step of executing photoelectric conversion of reference pulse light branched and input from the short pulse light generator and outputting a reference pulse signal;

a first extraction step of allowing only: an arbitrary frequency component to pass through from the measured pulse signal output from the first photoelectric conversion step and extracting a measured frequency signal;

a second extraction step of allowing only the same arbitrary frequency component to pass through from the reference pulse signal output from the second photoelectric conversion step and extracting a reference frequency signal;

a phase comparison step of detecting phase difference between the measured frequency signal output from the first extraction step and the reference frequency signal output from the second extraction step and outputting a phase difference signal; and a wavelength dispersion calculation step of measuring a group delay amount based on the phase difference signal output from the phase comparison step and calculating a wavelength dispersion value.

Therefore, the optical pulse signals containing the frequencies of an integral multiple of the fundamental frequency are propagated and wavelength dispersion measurement can be executed with good efficiency.

In this case, as in the invention of second aspect, in the light wavelength dispersion measuring apparatus according to the first aspect of the invention, preferably the first band-pass filter comprises a plurality of band-pass filters (for example, band-pass filters BPa1 to BPa3 in FIG. 2) for allowing only a plurality of different arbitrary frequency components to pass through from the measured pulse signal, the second band-pass filter comprises a plurality of band-pass filters (for example, band-pass filters BPb1 to BPb3 in FIG. 2) for allowing only a plurality of the same different arbitrary frequency components to pass through from the reference pulse signal, the phase comparison unit comprises a plurality of phase comparators (for example, phase comparators PCa to PCc in FIG. 2) each for detecting the phase difference between the measured frequency signal and the reference frequency signal of the same frequency output from each of the plurality of band-pass filters in the first band-pass filter and each of the plurality of band-pass filters in the second band-pass filter and outputting a phase difference detection signal for each frequency, and the wavelength dispersion calculation unit calculates the group delay amount based on a plurality of the phase difference detection signals output from the plurality of phase comparators in the phase comparison unit.

Further, in this case, as in fifth aspect of the invention, in the light wavelength dispersion measuring method according to the fourth aspect of the invention, preferably the first extraction step is to allow only different arbitrary frequency components to pass through from the measured pulse signal for extracting a plurality of measured frequency signals, the second extraction step is to allow only the same different arbitrary frequency components to pass through from the reference pulse signal for extracting a plurality of reference frequency signals, the phase comparison step is to detect the phase difference between the measured frequency signal and the reference frequency signal of the same frequency output from the first extraction step and the second extraction step and to output a phase difference detection signal for each frequency, and the wavelength dispersion calculation step is to calculate the group delay amount based on a plurality of the phase difference detection signals output from the phase comparison step.

Therefore, the band-pass filters are connected in parallel and the phase comparators are connected in parallel for making it possible to conduct phase difference measurement of the nth-order harmonics at the same time, so that the wavelength dispersion values of the nth-order harmonics can be calculated at the same time, the group delay amount can be calculated rapidly and accurately in the light wavelength dispersion measuring apparatus, and the measurement time of measuring the wavelength dispersion characteristic can be shortened.

Further, as in a third aspect of the invention, in the light wavelength dispersion measuring apparatus according to the second aspect of the invention, more preferably the wavelength dispersion calculation unit determines whether or not temperature correction of each phase detection value is required based on relative change between the phase difference detection signals output from the plurality of phase comparators in the phase comparison unit, and the light wavelength dispersion calculation unit executes temperature correction.

As in a sixth aspect of the invention, in the light wavelength dispersion measuring method according to the fifth aspect of the invention, preferably the wavelength dispersion calculation step is to determine whether or not temperature correction of each phase detection value is required based on relative change between the phase difference detection signals output from the phase comparison step, and execute temperature correction.

Therefore, the reliability of the light wavelength dispersion measuring apparatus can be enhanced.

DETAILED DESCRIPTION OF THE PREFFERED EMBODIMENTS

Referring now to the accompanying drawings, description will be given of an embodiment according to the invention.

FIGS. 1 to 4 are drawings to show one embodiment of a light wavelength dispersion measuring apparatus according to the invention.

First, a configuration of the light wavelength dispersion measuring apparatus will be discussed.

Figure 1:
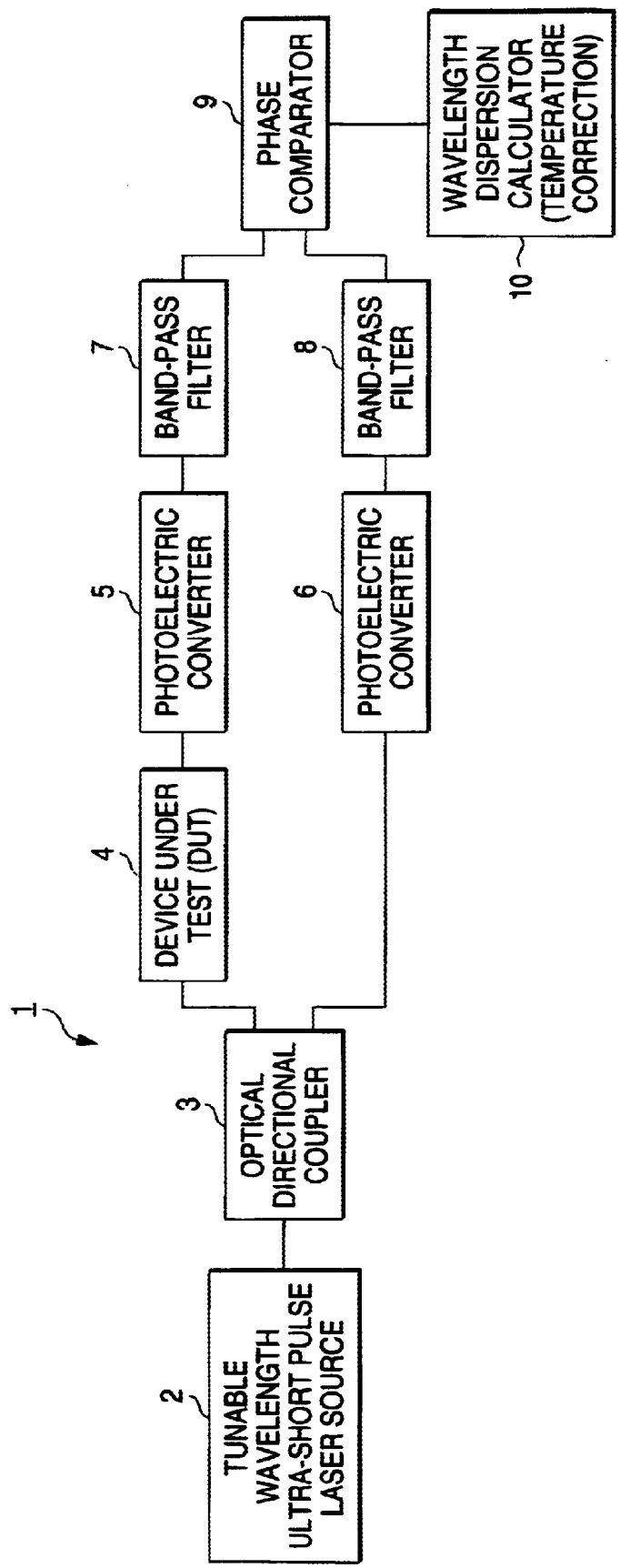
FIG. 1 is a block diagram to show the main configuration of a light wavelength dispersion measuring apparatus 1 in one embodiment incorporating the invention.

FIG. 1 is a block diagram to show the main configuration of the light wavelength dispersion measuring apparatus 1 in the embodiment. In FIG. 1, the light wavelength dispersion measuring apparatus 1 comprises a tunable wavelength ultra-short pulse Laser source 2, an optical directional coupler 3, a device under test (DUT) 4, photoelectric converters 5 and 6, band-pass filters 7 and 8, a phase comparator 9, and a wavelength dispersion calculator 10.

The tunable wavelength ultra-short pulse Laser source 2 is a wavelength variable light source and emits pulse light having a cycle of 2 gigahertz (GHz) and a pulse width of 0.1 nanoseconds (ns) or less, for example. The pulse light contains a large number of frequency components of an integral multiple of the fundamental frequency and thus need not be modulated from the outside.

The optical directional coupler 3 branches the pulse light input from the tunable wavelength ultra-short pulse Laser source 2 to light incident on the device under test (DUT) 4 and light used as reference light.

The device under test (DUT) 4 is implemented as an optical fiber, an optical amplifier, etc., for producing a wavelength dispersion phenomenon. The photoelectric converter 5 converts the pulse light undergoing wavelength dispersion in the device under test (DUT) 4 into an electric signal. The photoelectric converter 6 converts the reference light branched to one by the optical directional coupler 3 into an electric signal.

Figure 2:
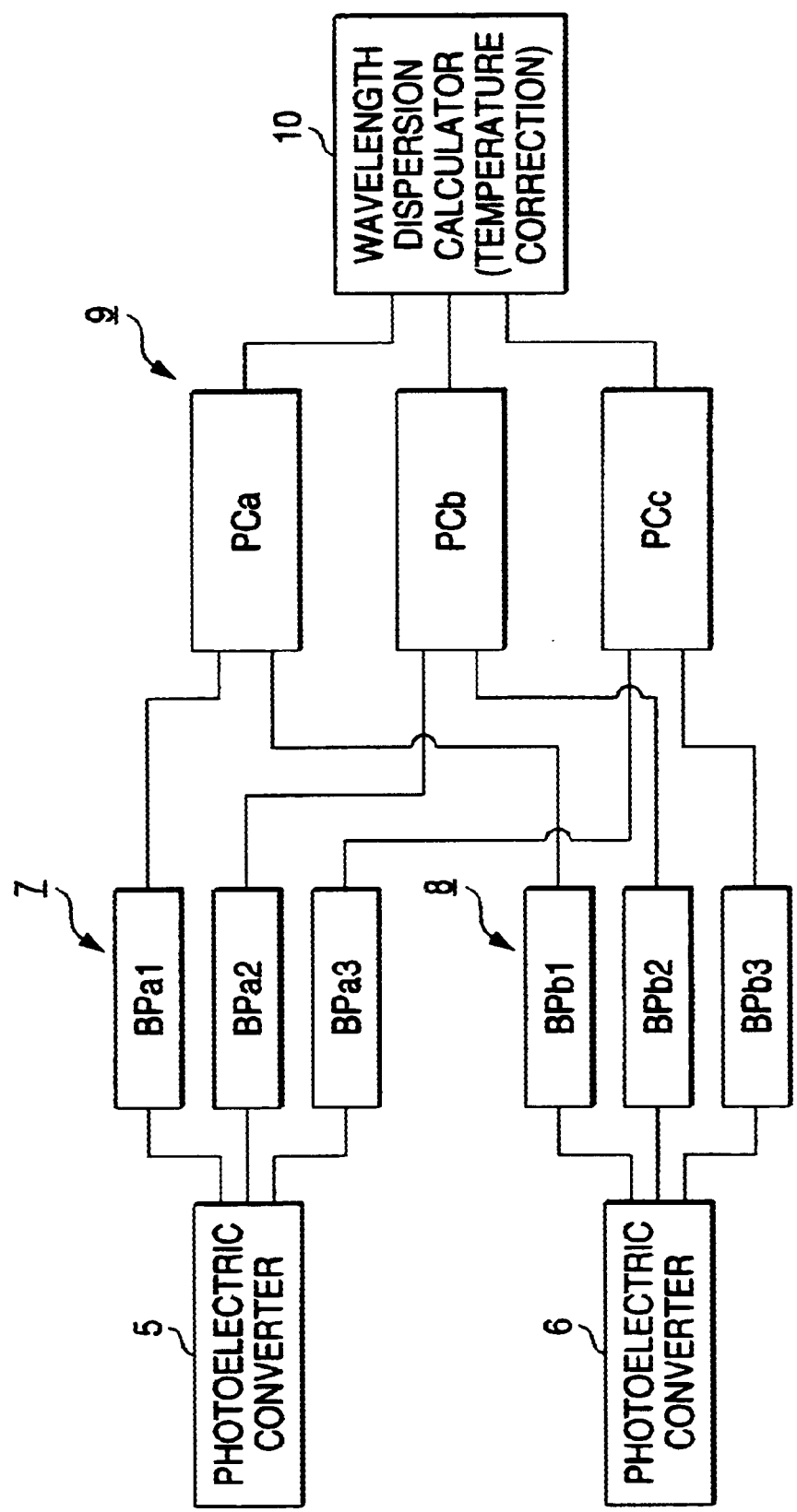
FIG. 2 is a block diagram to show the internal configuration of band-pass filters 7, 8 and a phase comparator 9 in FIG. 1.
Figure 3:
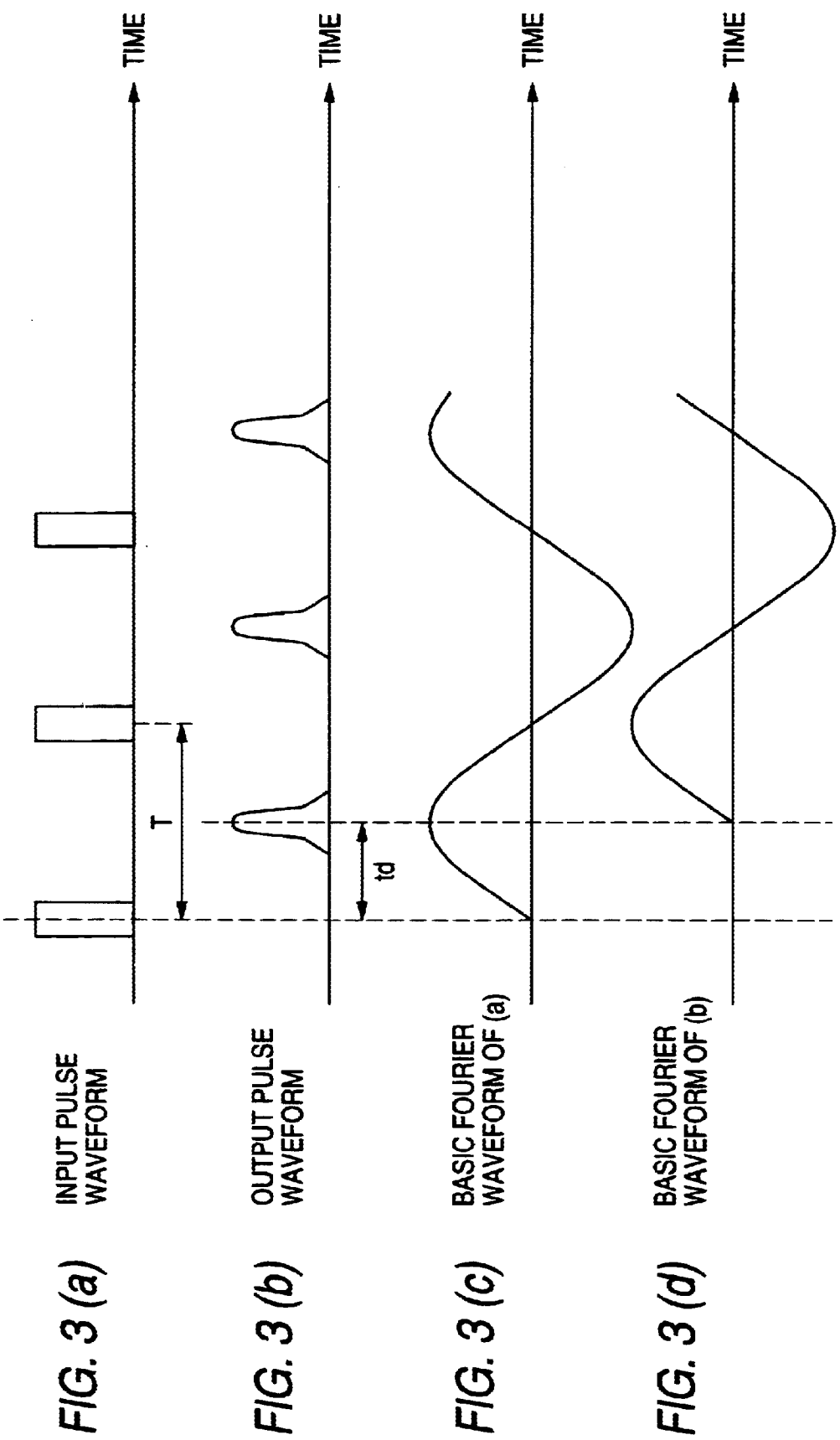
FIG. 3 is a timing chart of signals in the light wavelength dispersion measuring apparatus 1 in FIG. 1.

The band-pass filter 7, which comprises a plurality of band-pass filters BPa1 to BPa3 as shown in FIG. 2, allows only a plurality of any desired frequencies to pass through from the frequencies of an integral multiple of the fundamental frequency contained in the wavelength-dispersed pulse signal input from the photoelectric converter 5. Then, the band-pass filter 7 outputs the each wavelength dispersion frequency signal to the phase comparator 9.

The band-pass filter 8, which comprises a plurality of band-pass filters BPb1 to BPb3 as shown in FIG. 2, allows only a plurality of any desired frequencies to pass through from the frequencies of an integral multiple of the fundamental frequency contained in the reference pulse signal input from the photoelectric converter 6. Then, the band-pass filter 8 outputs the each reference frequency signal to the phase comparator 9.

The phase comparator 9, which comprises a plurality of phase comparators PCa to PCc as shown in FIG. 2, is input the wavelength dispersion frequency signals to from the band-pass filters BPa1 to BPa3 in the band-pass filter 7 and the reference frequency signals to from the band-pass filters BPb1 to BPb3 in the band-pass filter 8. Then, the phase comparator 9 detects the phase difference between the wavelength dispersion frequency signals and the reference dispersion frequency signals for each frequency, and outputs the each phase difference signal to the wavelength dispersion calculator 10.

The wavelength dispersion calculator 10 has a wavelength dispersion calculation processing function of calculating wavelength dispersion based on the phase difference information of the phase difference signals for each frequency input from the phase comparator 9 and a temperature correction function of determining whether temperature compensation processing is valid or invalid based on change tendency between the measurement wavelength values measured per unit time and then making a temperature correction of the measurement wavelength values.

Next, the operation of the embodiment of the light wavelength dispersion measuring apparatus will be discussed.

The pulse light emitted from the tunable wavelength ultra-short pulse Laser source 2 is branched by the optical directional coupler 3 to two directions. One pulse light is input via the short optical fiber to the photoelectric converter 6 as the reference light and the other pulse light is input to the device under test (DUT) 4 implemented as an optical device of a long-distance optical fiber, an optical amplifier, etc., and is input through the device under test (DUT) 4 to the photoelectric converter 5.

The pulse light input to the photoelectric converter 5 and the pulse light input to the photoelectric converter 6 are converted by photoelectric conversion into predetermined pulse signals, which then are input to the band-pass filters 7 and 8. Since the pulse signals contain the frequency components of an integral multiple of the fundamental frequency, the signal components are allowed to pass through the band-pass filters 7 and 8 every same frequency range. For example, assuming that the pulse signal has the fundamental frequency of 2 GHz, the frequency bands passing through the band-pass filters BPa1 to BPa3, BPb1 to BPb3 connected in parallel in FIG. 2 as the band-pass filter 7, 8 are set to 2 GHz, 4GHz, and 6 GHz.

Therefore, as the measured pulse signals input from the photoelectric converter 5 to the band-pass filters BPa1 to BPa3 and the reference pulse signals input from the photoelectric converter 6 to the band-pass filters BPb1 to BPb3, each fundamental frequency signal and the frequency signals of an integral multiple of the fundamental frequency are allowed to pass through separately at the same time. Thus, the fundamental frequency signal and the frequency signals of an integral multiple of the fundamental frequency contained in the measured pulse signals and the fundamental frequency signal and the frequency signals of an integral multiple of the fundamental frequency contained in the reference pulse signals are input at the same time to the phase comparators PCa to PCc connected in parallel in FIG. 2 as the phase comparator 9.

As a result, a plurality of pieces of measurement data are provided at the same time, so that the measurement time can be shortened and high-speed and accurate measurement can be conducted as compared with the case where the modulation frequency is changed and measurement is repeated in the related art.

The phase comparators PCa to PCc in the phase comparator detect the phase differences from the fundamental frequency signal and the frequency signals of an integral multiple of the fundamental frequency contained in the measured pulse signals, and the fundamental frequency signal and the frequency signals of an integral multiple of the fundamental frequency contained in the reference pulse signals. Then, the phase comparators PCa to PCc in the phase comparator 9 output the phase difference signals to the wavelength dispersion calculator 10.

Next, the wavelength dispersion calculation processing executed in the wavelength dispersion calculator 10 will be discussed with reference to FIGS. 3A to 3D to show examples of the signals.

FIG. 3A shows an example of the reference pulse signal of wavelength $\lambda$ (cycle T) input from the photoelectric converter 6 to the band-pass filter 8 and FIG. 3B shows an example of the measured pulse signal of wavelength $\lambda$ (cycle T) input from the photoelectric converter 5 to the band-pass filter 7.

The input time difference between the reference pulse signal and the measured pulse signal, td ($\lambda$), can be shown as the following expression (2):

$$td(\lambda) = tout(\lambda) - tin(\lambda) \tag{2}$$

where tout ($\lambda$): Measured pulse signal, tin ($\lambda$): Reference pulse signal.

td ($\lambda$) corresponds to group delay amount $\beta'$ of the device under test (DUT) 4. Here, assuming that group velocity $vg = 1/\beta'$ where $\beta' = d\beta/d\omega$, the time difference td ($\lambda$) can be shown as the following expression (3):

$$td(\lambda) = L/vg(\lambda) = L \cdot \beta'(\lambda) \tag{3}$$

where L: Fiber length, $\beta$: Propagation constant

Next, wavelength dispersion D ($\lambda$) can be shown as the following expression (4):

$$D(\lambda) = d\beta'(\lambda)/d\lambda \tag{4}$$

Further, FIG. 3C shows the basic Fourier transform sine wave component of the envelope in FIG. 3A (fundamental frequency component 1/T) and FIG. 3D shows the basic Fourier transform sine wave component of the envelope in FIG. 3B (fundamental frequency component 1/T). The value of td (x) corresponds to the phase difference between sine waves (c) and (d)

The phase difference $\theta_d$ ($\lambda$) between the sine waves (c) and (d) is measured in the phase comparator 9. Generally, to detect the nth-order harmonic, the time difference td ($\lambda$) is shown as the following expression (5)

$$td(\lambda) = T \cdot \theta_d(\lambda)/(2\pi n) \tag{5}$$

Therefore, the following expression (6) can be obtained from expressions (3) and (5)

$$\beta'(\lambda) = T \cdot \theta_d(\lambda)/(2\pi n L) \tag{6}$$

If the expression (6) is applied to expression (4), the wavelength dispersion D ($\lambda$) becomes as the following expression (7):

$$D(\lambda) = (T/(2\pi n L)) \cdot d\theta_d(\lambda)/d\lambda \tag{7}$$

Here, optical pulse generation frequency f (f=1/T) is about several GHz. When the measured phase difference $\theta_d$ is larger than $2\pi$ ($\theta_d = p \cdot 2\pi + \theta_O$ where p: Integer value representing a multiple of fundamental frequency), a plurality of phase comparators and a plurality of band-pass filters need to be provided to accurately calculate the wavelength dispersion D ($\lambda$) every p. For example, to conduct parallel phase difference measurement of nth-order harmonics with respect to n=1, 4, 8, the band-pass filters BPa1 to BPa3 and BPb1 to BPb3 connected in parallel as the band-pass filters 7 and 8 and the phase comparators PCa to PCc connected in parallel as the phase comparator 9 as shown in FIG. 2 are required.

Thus, the three band-pass filters BPa1 to BPa3 are connected in parallel, the three band-pass filters BPb1 to BPb3 are connected in parallel, and the three phase comparators PCa to PCc are connected in parallel for making it possible to conduct parallel phase difference measurement of the nth-order harmonics (n=1, 4, 8) at the same time, so that the wavelength dispersion calculator 10 can calculate the wavelength dispersion values of the nth-order harmonics (n=1, 4, 8) at the same time.

The FFT (fast Fourier transform) technique is adopted for measuring the phase differences, whereby phase detection processing of the nth-order harmonics contained in the pulse signals can be facilitated.

Next, the temperature correction processing of the measurement wavelength value executed in the wavelength dispersion calculator 10 will be discussed with reference to FIG. 4 to show examples of the measurement wavelength values.

Figure 4:
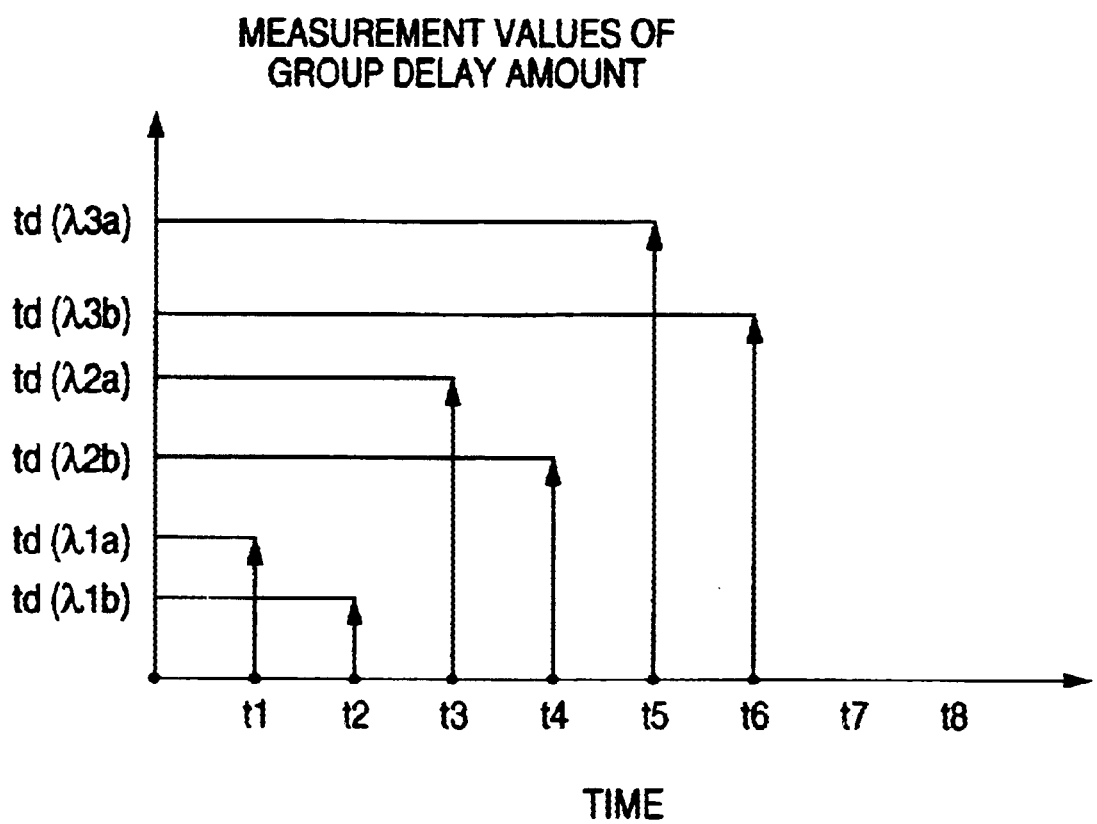
FIG. 4 is a drawing to show an example of the measurement result of group delay amounts measured in the light wavelength dispersion measuring apparatus 1 in FIG. 1.
Figure 5:
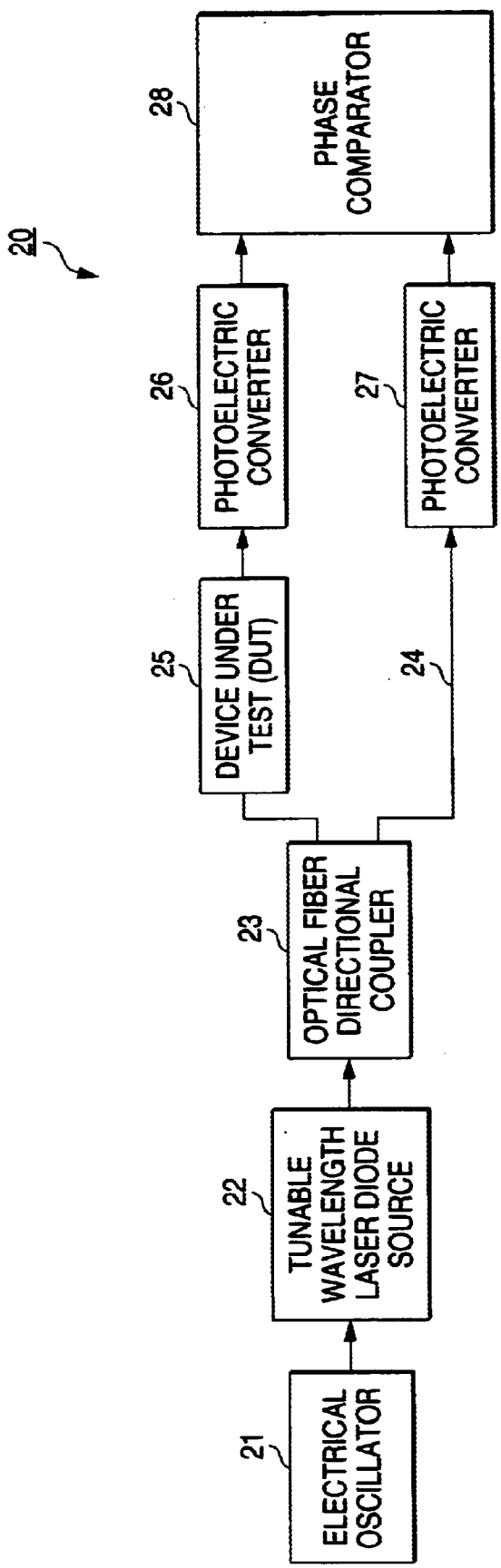
FIG. 5 is a block diagram to show main configuration of a light wavelength dispersion measuring apparatus 20 in a related art.

FIG. 4 is a graph using the measurement time to enter the horizontal axis and the measurement wavelength values to enter the vertical axis, wherein the group delay amount is measured twice at the same wavelength and measurement wavelength values td ($\lambda 1a$), td ($\lambda 1b$), td ($\lambda 2a$), td ($\lambda 2b$), td ($\lambda 3a$), and td ($\lambda 3b$) are plotted.

The long-distance optical fiber installed as the device under test (DUT) 4 in FIG. 1 has a possibility that if the ambient temperature changes, the length of the optical fiber will also change, and temperature correction processing needs to be performed to improve the measurement accuracy of the measurement wavelength value in response to the change in the length of the optical fiber caused by the ambient temperature. A temperature correction method in the embodiment will be discussed.

For each wavelength value $\lambda i$ (i: 1 to 3) shown in FIG. 4, the number of td measurements m is two. First, the relative difference between each wavelength value is calculated and ambient temperature dependency is examined.

In FIG. 4, measurement on each wavelength $\lambda i$ is carried out twice at measurement time tn at equal intervals (n: 1 to 8), and line approximation (or curve approximation) is conducted for the relative difference value td ($\lambda ia$)–td ($\lambda ib$)/ td ($\lambda ia$) of every wavelength $\lambda i$ in a given time (for example, 0.005 sec). Whether or not temperature correction is required is determined based on whether or not the line constant of the each relative difference value thus calculated is larger than a predetermined value.

In the wavelength dispersion calculator 10 in the embodiment, if the line constant is smaller than the predetermined value, temperature correction processing is not performed and if the line constant is larger than the predetermined value, temperature correction processing is performed. The contents of the temperature correction processing involve a known technique and therefore will not be discussed here.

As described above, the light wavelength dispersion measuring apparatus 1 in the embodiment can propagate the optical pulse signals containing the frequencies of an integral multiple of the fundamental frequency by the tunable wavelength ultra-short pulse Laser source 2 for executing wavelength dispersion measurement with good efficiency.

In the light wavelength dispersion measuring apparatus 1 in the embodiment, the three band-pass filters BPa1 to BPa3 are connected in parallel, the three band-pass filters BPb1 to BPb3 are connected in parallel, and the three phase comparators PCa to PCc are connected in parallel for making it possible to conduct phase difference measurement of the nth-order harmonics (n=1, 4, 8) at the same time, so that the wavelength dispersion calculator 10 can calculate the wavelength dispersion values of the nth-order harmonics (n=1, 4, 8) at the same time. As a result, the measurement time of measuring the wavelength dispersion characteristic in the light wavelength dispersion measuring apparatus can be shortened.

Further, in the light wavelength dispersion measuring apparatus 1 in the embodiment, the wavelength dispersion calculator 10 determines whether or not temperature correction processing is required based on the relative difference value between the measurement wavelength values for reliably executing temperature correction processing of the measurement value, so that the reliability of the light wavelength dispersion measuring apparatus can be enhanced.

In the embodiment of the invention, the number of parallel stages of the components of the band-pass filter 7, 8 and the frequency range passing through the band-pass filter 7, 8 and the number of parallel stages of the components of the phase comparator 9 are not limited and can be changed as desired.

According to the light wavelength dispersion measuring apparatus of first aspect of the invention and the light wavelength dispersion measuring method of fourth aspect of the invention, the optical pulse signals containing the frequencies of an integral multiple of the fundamental frequency are propagated and wavelength dispersion measurement can be executed with good efficiency.

According to the light wavelength dispersion measuring apparatus of second aspect of the invention and the light wavelength dispersion measuring method of fifth aspect of the invention, the band-pass filters are connected in parallel and the phase comparators are connected in parallel for making it possible to conduct phase difference measurement of the nth-order harmonics at the same time, so that the wavelength dispersion values of the nth-order harmonics can be calculated at the same time, the group delay amount can be calculated rapidly and accurately in the light wavelength dispersion measuring apparatus, and the measurement time of measuring the wavelength dispersion characteristic can be shortened.

According to the light wavelength dispersion measuring apparatus of third aspect of the invention and the light wavelength dispersion measuring method of sixth aspect of the invention, whether or not temperature correction processing is required is determined for reliably executing temperature correction processing of the measurement wavelength value, so that the reliability of the light wavelength dispersion measuring apparatus can be enhanced.

What is claimed is:

1. A light wavelength dispersion measuring apparatus comprising:
   a short pulse light generator adapted to generate short pulse light;
   an optical coupler to branch the short pulse light from the generator to provide a pulse light to a device under test and a reference pulse light;
   a first photoelectric conversion unit adapted to receive measured pulse light outputted from the device under test and adapted to execute photoelectric conversion of the measured pulse light to output a measured pulse signal;
   a second photoelectric conversion unit adapted to execute photoelectric conversion of the reference pulse light to output a reference pulse signal;
   a first band-pass filter adapted to extract a first frequency signal having a frequency component from the measured pulse signal;
   a second band-pass filter adapted to extract a second frequency signal having the same frequency component as that of the first frequency signal from the reference pulse signal;
   a phase comparison unit adapted to detect a phase difference between the first frequency signal and the second frequency signal to output a phase difference signal; and
   a wavelength dispersion calculation unit adapted to measure a group delay amount based on the phase difference signal to calculate a wavelength dispersion value.

2. The light wavelength dispersion measuring apparatus according to claim 1,
   wherein the first band-pass filter includes a plurality of band-pass filters adapted to extract a plurality of first frequency signals each having a different frequency component from the measured pulse signal;
   the second band-pass filter includes a plurality of band-pass filters adapted to extract a plurality of second frequency signals each having the same frequency component as that of each of the first frequency signal from the reference pulse signal;
   the phase comparison unit includes a plurality of phase comparators adapted to detect the phase differences for the frequency components between the first frequency signals and the second frequency signals to output a plurality of phase difference signals, respectively; and
   the wavelength dispersion calculation unit calculates the group delay amount based on the plurality of phase difference signals.

3. The light wavelength dispersion measuring apparatus according to claim 2 wherein the wavelength dispersion calculation unit determines whether or not temperature correction of each of the phase difference signals is required based on relative change between the phase difference signals and executes temperature correction.

4. A light wavelength dispersion measuring method comprising the steps of:
   generating a short pulse light:
   branching the short pulse light to provide a pulse light to a device under test from which measured pulse light is outputted and to provide a reference pulse light, converting the measured pulse light into a measured pulse signal photoelectrically;
   converting the reference pulse light into a reference pulse signal photoelectrically;
   extracting a first frequency signal having a frequency component from the measured pulse signal;
   extracting a second frequency signal having the same frequency component as that of the first frequency signal from the reference pulse signal;
   detecting a phase difference between the first frequency signal and the second frequency signal to output a phase difference signal; and calculating a group delay amount based on the phase difference signal to obtain a wavelength dispersion value.

5. The light wavelength dispersion measuring method according to claim 4 wherein;

the first frequency signal extracting step extracts a plurality of first frequency signals each having a different frequency component from the measured pulse signal;

the second frequency signal extracting step extracts a plurality of Second frequency signals each having the same frequency component as that of each of the first frequency signal from the reference pulse signal;

the phase difference detecting step detects a plurality of phase differences for the frequency components between the first frequency signals and the second frequency signals to output a plurality of phase difference signals, respectively; and the group delay amount calculating step calculates a group delay amount based on the plurality of phase difference signals to obtain a wavelength dispersion value.

6. The light wavelength dispersion measuring method according to claim 5 wherein the group delay amount calculating step determines whether or not temperature correction of each of the phase difference signals is required based on relative change between the phase difference signals and executes temperature correction.

* * * * *